May 9, 1939.  A. LONGORIA  2,157,769

METHOD AND APPARATUS FOR WELDING

Filed Nov. 19, 1937

INVENTOR.
ANTONIO LONGORIA
BY Bates, Goldrick, & Teare
ATTORNEYS

Patented May 9, 1939

2,157,769

UNITED STATES PATENT OFFICE 2,157,769

METHOD AND APPARATUS FOR WELDING

Antonio Longoria, Lakewood, Ohio, assignor to Niagara Wire Weaving Company, Ltd., Niagara Falls, Ontario, Canada, a corporation of Ontario, Canada Application November 19, 1937, Serial No. 175,432

6 Claims. (Cl. 219—8)

This invention relates to a method and apparatus for electrically welding materials such as wires which have a relatively small diameter of a size that is adapted for use in the manufacture of belts for Fourdrinier paper making machines. Wires that are commonly used for making such belts have a diameter approximating ten-thousandths of an inch and the material of which the wire is made is relatively soft, and has a low melting point. The difficulty in making a seam by welding has been due to the fact that an excessive application of heat would burn the metal, while an insufficient amount of heat would result in a union of low mechanical strength.

I have heretofore devised a method and apparatus of welding wires of the size that are used in the manufacture of Fourdrinier belts, but in such method and apparatus, I utilized an alternating current source of supply together with means for rectifying and filtering the circuit and with means for maintaining the constants of the circuit at such value that would assure a satisfactory weld. While I have produced in my former efforts, a weld which is satisfactory insofar as the non-clogging characteristics of the belt are concerned, nevertheless the strength of the metal at the weld approximated only about seventy percent (70%) of the strength of the metal at any other point. While this result may have been satisfactory for some types of belt, it was highly desirable that the strength be materially increased, so as to extend the usefulness of the invention to a greater range of application. In this connection, it is important to note that belts on Fourdrinier machines operate under different conditions of speed and strain and that a seam which might work satisfactorily in one plant might not be most suitable for satisfying the conditions in another plant.

An object of the present invention therefore is to improve the method and apparatus heretofore devised, so as to obtain a joint of improved strength and thereby to extend the field of usefulness of a welded joint.

In carrying out my object, the present invention contemplates the production of a method, which can be produced with unskilled labor, and which does not result in a seam that would clog the openings of a Fourdrinier belt.

Figure 1:
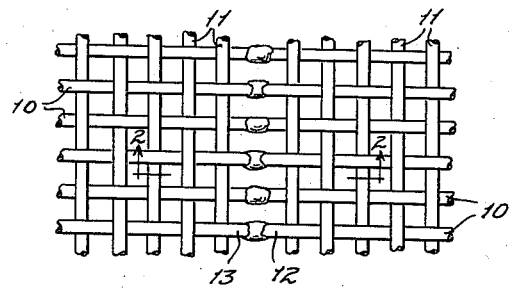
Figure 2:
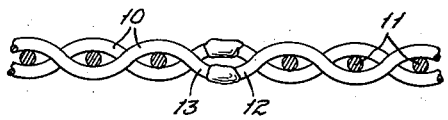
Figure 3:
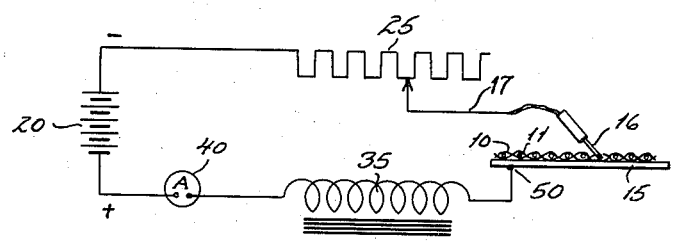
Figure 4:
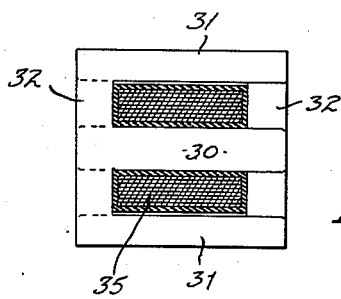

Referring now to the drawing, Fig. 1 is a top plan view of a woven wire fabric that is welded in accordance with my invention; Fig. 2 is a section taken on the line 2—2 in Fig. 1 and Fig. 3 is a wiring diagram, Fig. 4 is a section taken through the low resistance, high inductance coil.

To illustrate an article upon which a weld may be made in accordance with the present method and apparatus, I have shown a joint in a woven wire fabric, wherein the warp wires are indicated at 10 and the weft wires at 11. In such embodiment, the warp pickets 12 on one end of the fabric are laid in overlapping relationship to the warp pickets 13 on the other end, preferably upon a current conducting work table 15 so that the table and work in effect constitute one terminal of an electric circuit. The other terminal may comprise a needle 16 which is attached to a flexible conductor 17 of sufficient length to permit manipulation of the needle by an operator in making the weld.

The method and apparatus embodying the present invention utilizes a source of direct-current supply, such as a battery 20. For welding brass wires having a diameter of approximately ten-thousandths of an inch, a battery having a rating of 90-ampere hours at 4 to 6-volts is adequate. The positive side of the source of supply is connected to the plate 15 while the negative side is connected to the electrode or needle 16. Additionally, each side of the line has apparatus connected therein which regulate the constants of the current to produce the desired weld. I have found that such regulation will result in an arrangement that enables a circuit to be closed through the work without burning the metal or imparting objectionable physical characteristics to it, but that when the circuit is broken, the discharge surge is sufficient to impart adequate heat to weld the wires solely by fusion.

As an example of the apparatus, that is suitable for carrying out my invention, I have found that for brass wires having a diameter of approximately ten-thousandths of an inch, there should be a non-inductive rheostat 25 of 1.0 ohm resistance connected to the negative side of the circuit and an induction coil 35 connected to the positive side of the circuit.

To illustrate the construction of the inductance coil for welding wires of the character and size mentioned and with an electric storage battery of the capacity indicated as a source of a current supply, I have found that best results are obtained by utilizing a shell type of core that is made up of stacks of opposed E-shaped laminations which result in a central leg 30, outer legs 31, and end legs 32. The coil 35 is wound around the central leg and inside the outer legs. The core is sufficient in size to receive the coil which is made up of 6-layers of No. 12 B & S gauge E. S. C., wherein each layer has 54-turns. This would result in a coil having a resistance of .63 ohm at 74 degrees F. If desired, an ammeter indicated at 40 may be connected in the positive side of the circuit.

In using the apparatus described, the positive side of the battery or other source of direct-current supply is rigidly connected as at 50 to the plate 15, and thereupon the wires to be joined are laid upon the plate with the ends in overlapping relationship. Then the needle 16 which is connected to the negative side of the source of supply is placed into contact with one of the two overlapping wires, and thereafter is withdrawn. No weld occurs at the time of making contact between the needle and the work, but upon withdrawal of the needle, an arc of sufficient intensity to effect a weld is drawn. An adjustment on the rheostat enables the intensity of the arc to be varied in accordance with the diameter of the wire or the melting point of it.

By utilizing a non-inductive rheostat on one side of the circuit and an inductance coil on the other side, I have been able to use a storage battery as a source of direct-current source of supply, and I have produced joints having a surprisingly increased strength over any method heretofore known to me. In addition, I have greatly diminished the size of the equipment by means of which the welding may be accomplished.

I claim:—

1. An apparatus for electric welding, comprising an electric circuit, said circuit including a source of direct-current supply, a work contactor and a non-consuming electrode, the work contactor being connected to the positive terminal of the source of supply and the electrode being connected to the negative terminal of the source of supply, a low resistance, high inductance coil in the circuit between the source of supply and the work contactor, and a non-inductive rheostat in the circuit connected between the source of supply and the electrode.

2. An apparatus for electric welding comprising a direct-current source of supply, two non-consuming work contactors, means for connecting one of the contactors to the positive pole of the source of supply, means for connecting the other contactor to the negative pole of the source of supply, one of said means including a low resistance, high inductance coil and the other of said means including a non-inductive rheostat.

3. An electric welding apparatus comprising a direct-current source of supply, a current conducting work support, means including a low resistance, high inductance coil for connecting the work to one terminal of the source of supply, a non-consuming current conducting member adapted to cooperate with the work support to complete a circuit through the work to be welded, and means including a non-inductive rheostat for connecting the member to the other terminal of the source of supply.

4. An electric welding apparatus comprising a source of current supply having positive and negative terminals, two non-consuming current carrying members adapted for conducting current through the work to be welded, means for connecting one of the members to one of said terminals, means for connecting the other member to the other of said terminals, one of said means including a low resistance, high inductance coil and the other of said means including a non-inductive rheostat.

5. An apparatus for electric welding, comprising a source of direct-current supply having positive and negative terminals, a current conducting work support, means for connecting the work support to the positive terminal of the source of supply, said means including a low resistance, high inductance coil, a non-consuming current conducting member adapted to cooperate with the work support to conduct current through the work to be welded, means for connecting said member to the negative terminal of the source of supply, said last named means including a non-inductive rheostat, the constants of the circuit being maintained sufficiently low to avoid burning of the work or imparting objectionable physical characteristics thereto while the circuit is closed, and to weld the metal upon breaking of the circuit at the point of closure whereby the welding occurs solely by fusion of the metal.

6. A method of electric welding comprising utilizing a source of direct current supply, connecting one terminal of the source of supply to the work, completing the circuit through a non-consuming electrode to the work to be welded, maintaining a fixed low resistance and high inductance on the positive side of the circuit, utilizing a variable non-inductive resistance on the negative side of the circuit and adjusting the resistance to the physical characteristics of the metal to be welded so as to maintain the constants of the circuit sufficiently low to avoid burning of the metal during closing of the circuit but to effect a union solely by the fusion upon breaking of the circuit.

ANTONIO LONGORIA.